United States Patent Office 3,422,044
Patented Jan. 14, 1969

3,422,044
AQUEOUS COATING COMPOSITIONS COMPRISING A SALT OF A HEAT-BODIED MALEINIZED OIL AND A POLYMERIC LATEX
J. Alden Erikson and Roger M. Christenson, Gibsonia, Pa., assignors to PPG Industries, Inc., Pittsburgh, Pa., a corporation of Pennsylvania
No Drawing. Filed Oct. 28, 1964, Ser. No. 407,248
U.S. Cl. 260—23.7                12 Claims
Int. Cl. C08f 21/04; C08f 43/08

ABSTRACT OF THE DISCLOSURE

Vehicles suitable for water-dispersed coating compositions having improved stability and pigment wetting characteristics are produced by reacting maleic anhydride with a drying oil and heating the adduct until the viscosity is substantially increased. From 8 to 15 percent by weight of maleic anhydride is used in the initial step and heating is continued to a specified minimum viscosity which is correlated with the amount of maleic anhydride. The product is then hydrolyzed and reacted with a base to form a water-soluble material.

---

This invention relates to vehicles suitable for use in water-dispersing coating compositions, and more particularly to such vehicles comprising a solubilized, modified maleic anhydride-drying oil reaction product.

Reaction products of maleic anhydride with drying oils, the so-called maleinized oils, have been known for some time, as has their use in coating compositions. Certain water-based primers suitable for application by dipping have been widely utilized in which solubilized maleinized oils are employed, often along with a synthetic polymeric latex.

In the use of such coating compositions certain problems have been troublesome. For example, water-based coating compositions containing maleinized oil vehicles tend to exhibit poor package stability and often tend to foam when applied by dipping. Also, the pigment wetting characteristics of the maleinized oils are such that dispersion of pigments therein requires lengthy and time-consuming procedures. Further, the pigment pastes obtained from such materials, when formulated into coating compositions, tend to flocculate and often become unsuitable for use.

It has now been found that certain maleinized oils, when modified in accordance with the process described below, provide vehicles and coating compositions which overcome the aforementioned disadvantages of ordinary maleinized oil compositions.

The modified maleinized oils of the present invention are produced by the following steps:

(1) Maleic anhydride and a drying oil are co-reacted at elevated temperatures to form a maleinized oil.

(2) The maleinized oil is further heated until its viscosity is substantially increased.

(3) The heat-treated maleinized oil is hydrolyzed to convert the remaining anhydride groups to carboxyl groups.

(4) The resulting resin is reacted with a base to provide a water-soluble product.

The product thus obtained is suitable for use as a vehicle for water-based coating compositions employed as primers and for other uses.

The initial reaction is carried out with from about 8 to about 15 percent by weight of maleic anhydride, based on the total weight of the maleic anhydride and the oil. The reaction takes place readily without a catalyst and requires temperatures in the range of about 100° C. to 300° C. or higher, and preferably between 240° C. and 290° C.

Various drying oils can be employed, these being considered as oils having an iodine value above about 90, as determined by Method ASTM D1467–57T. Such oils include linseed oil, soya oil, safflower oil, tung oil, tall oil esters, dehydrated castor oil, fish oils and the like. Also included are oils modified with other acids, such as phthalic acid (or anhydride) or benzoic acid, by first forming a di- or monoglyceride or a mixture thereof by alcoholysis, followed by esterification. Polyols other than glycerol can also be employed in the alcoholysis. The oils can also be modified with styrene or other monomers.

The second step of the process involves further heating of the maleinized oil to increase its viscosity to a point above the normal viscosity of the maleinized oil. This step is ordinarily carried out as a continuation of the initial reaction without interruption of the heating cycle; similar temperatures to those employed in the initial reaction are utilized, although it is not necessary to employ the same temperature. The heating, in any event, should be discontinued short of gelation of the mixture. Ordinarily, the total time of heating, including the reaction time and the heat treatment, requires from 2 to 8 hours.

The normal viscosity of a maleinized oil made in accordance with the prior art varies, depending upon the proportion of maleic anhydride therein. The products herein are, in all cases, additionally heated for a time sufficient to increase the viscosity substantially beyond that normally attained, but the minimum viscosity which the products herein attain is also dependent upon the maleic anhydride content. To a certain extent, the temperature and time of treatment also affect the degree of viscosity increase necessary. Table I below shows the normal viscosity of the maleinized oils within the invention, as produced using the conventional method, along with the minimum viscosity to which the corresponding heat-treated products are raised in accordance with the invention. The viscosity to which the products are preferably raised is also given. (This is also a minimum, since higher viscosities, short of gelation and limited only by practical considerations, can be used.) All viscosities shown are in centipoises at 25° C.

TABLE I

| Maleic anhydride weight, percent | Normal viscosity | Minimum viscosity | Preferred minimum viscosity |
|---|---|---|---|
| 8 | 250 | 700 | 900 |
| 9 | 340 | 1,000 | 1,200 |
| 10 | 470 | 1,500 | 1,750 |
| 11 | 620 | 1,900 | 2,300 |
| 12 | 880 | 2,500 | 3,200 |
| 13 | 1,180 | 3,100 | 4,100 |
| 14 | 1,760 | 3,700 | 5,900 |
| 15 | 2,270 | 4,500 | 8,100 |

In the next step, the heat-treated product is mixed with water, whereby the anhydride groups present are hydrolyzed to form carboxyl groups. This step does not require any particular conditions, and is easily carried out by cooling the reaction mixture to below the boiling point of water and adding the water with agitation. Complete hydrolysis of the anhydride groups, as is preferred, is insured by stirring the water-oil mixture at elevated temperatures, such as reflux, until the acid number becomes constant. The water can be added at higher temperatures or at lower temperatures, but at higher temperature bubbling and foaming may be encountered, and at lower temperatures the hydrolysis reaction requires additional time.

The hydrolyzed product is then solubilized by reaction with a base, so that at least part of the acidic carboxyl groups are neutralized. This reaction can be carried out with essentially any base, including inorganic bases such as sodium hydroxide or, preferably, ammonia, or there can be employed an organic base, such as an amine or a quaternary ammonium hydroxide. Among the amines which are most effectively employed are those capable of forming water-soluble salts, for example, primary, secondary and tertiary amines such as methylamine, ethylamine, propylamine, dimethylamine, diethylamine, dihexylamine, trimethylamine, tributylamine, trihexylamine, monoethanolamine, diethanolamine, morpholine, cyclohexylamine, benzylamine and the like. Among the quaternary ammonium hydroxides that can be utilized if desired are trimethylbenzyl ammonium hydroxide, triethylbenzyl ammonium hydroxide, trimethyllauryl ammonium hydroxide and similar compounds.

It is preferred to employ secondary lower alkylamines as a neutralizing agent, and of these diethylamine is often used and has been found to provide products with exceptionally good corrosion resistance.

As indicated, at least some and preferably a major part or all of the acidic carboxyl groups are neutralized. The neutralized products have a pH of at least about 7 and preferably at least about 8, and the pH is ordinarily taken as the measure of neutralization.

The exact nature of the product obtained from the foregoing process is not completely understood, but its superior properties are in a large part attributed to the heat treatment step. During this step some decarboxylation of the maleinized oil takes place, along with a degree of polymerization, with a decrease in the level of unsaturation. There may also be involved some lactone formation and a partial Friedel-Crafts type attack of anhydride on the double bonds of the oil.

One of the particular advantages of the present products is that they can be solubilized at a higher pH, especially in an alcohol-water solvent mixture, than the malenized oil products known heretofore. When dissolved in water or a combination of water and a coupling solvent at 40 percent solids (i.e., solutions containing 40 percent by weight of non-volatile resin solids), the products herein are treated with sufficient base so as to provide a pH between 7 and 11, and preferably between 8 and 10. At such relatively high pH values, the clear solutions obtained have improved wetting properties and good stability.

Water alone may be used as a solvent for the solubilized products, but it is preferred to employ a combination of water and a coupling solvent. The coupling solvent may comprise up to about 50% of the solvent mixture, and the solvent mixtures usually employed contain about 15 to 50 percent of such a solvent. Among the coupling solvents that are employed are the alkyl monoethers of ethylene glycol and diethylene glycol (known as the alkyl Cellosolves and alkyl Carbitols), furfuryl alcohol, dioxane, 3-methoxy-4-methylpentanone-2, and others which have an appreciable solubility in water and in which the neutralized maleinized oil is appreciably soluble. The use of a coupling solvent additionally decreases any foaming tendencies of the composition and insures the clarity of the solutions.

There may also be included in the solvent mixture a minor proportion of a hydrocarbon solvent, such as naphtha or, more desirably, xylene or other aromatic solvent. Such a solvent, when included, preferably comprises 10 to 25 percent by weight of the solvent mixture. As compared to the ordinary maleinized oils known heretofore, the present compositions are unique in providing stable, homogenous solutions containing an appreciable proportion of hydrocarbon solvent. The presence of hydrocarbon solvent is particularly desirable when the composition is to be applied by dipping, aiding in obtaining suitable viscosity and additionally inhibiting foaming. Thus, for such uses, the preferred solvent mixture comprises 30 percent to 60 percent water, 20 percent to 40 percent of a coupling solvent, and 10 percent to 25 percent of a hydrocarbon solvent.

In utilizing the aforesaid modified maleinized oils in coating compositions, it is often preferred to include therewith as part of the vehicle of the composition another resinous material which is either soluble in water, emulsifiable in water, or dispersible in water. The preferred materials of this type are synthetic polymeric latices.

Examples of suitable copolymer latices are diolefinvinyl aromatic hydrocarbon copolymers, such as copolymers, of styrene and butadiene or styrene and isoprene, or similar copolymers. Other latices that can be employed include polymers in which a major component is an ester of an acrylic acid, using the term "an acrylic acid" to refer to acrylic acid and its alpha-substituted homologs. These are exemplified by the styrene-ethyl acrylate and methyl methacrylate-butadiene latices and similar acrylic materials. Many such synthetic polymeric latices are known in the art and a number are available commercially.

In addition to the synthetic polymeric latices as described above, other resins which may be included with the maleinized oil products include the various water-soluble amine-aldehyde resins and the water-soluble epoxy resins.

The ratio of the solubilized maleinized oil to the other resinous materials, if one is employed, can be varied widely, but in general, the maleinized oil comprises at least 20 percent by weight of the total resinous components.

While the products herein can be utilized to form clear films, their greatest utility is found in pigmented compositions which are formulated using conventional pigments, as well as additives such as wetting agents, driers, anti-foaming agents, and the like. Among the pigments which may be utilized are titanium dioxide, carbon black, talc, barytes, zinc oxide, strontium chromate, iron oxide and similar materials. Color pigments such as cadmium yellow, phthalocyanine blue and the like can also be included if desired.

The coating compositions produced from the products of the invention can be applied by any conventional means, including brushing, spraying and the like, but are particularly advantageous when applied by dipping. They can also be applied by electrodeposition, in which the article to be coated is immersed in the coating composition and becomes the anode while a current is passed through the solution. The coatings of the compositions comprising the products herein have excellent adhesion to metals, including the various treated steels employed for many appliances, automobiles and similar articles. After application, the compositions are cured by heating, with a typical baking schedule being from 10 minutes to 30 minutes at 250° F. to 350° F.

The invention will be further described in connection with the following examples, which serve to illustrate the invention in its preferred embodiments, but are not intended to limit it to the details given. All parts and percentages are by weight unless otherwise specified.

EXAMPLE 1

A reaction vessel was charged with 1760 parts of linseed oil and 240 parts of maleic anhydride and heated to 290° C. with stirring under an inert gas blanket. Heating was continued for about 2 hours, at which time the reaction product had a Gardner-Holdt viscosity of Z4. The product was cooled to 95° C. and 250 parts of deionized water were added. This mixture was then refluxed at 100° C. for 3 hours and cooled. The hydrolyzed maleinized oil was then solubilized by mixing the following:

| | Parts by weight |
|---|---|
| Hydrolyzed maleinized oil | 1125 |
| Diethylamine | 90 |
| Deionized water | 629 |
| Ethyl Cellosolve | 424 |
| Butyl Carbitol | 47 |

This product had a solids content of 42.8 percent, an acid value of 41.4, a pH of 8.2 and a Gardner-Holdt viscosity of X—Y. After heating a sample for 7 days at 120° F., its viscosity was W and its pH was 7.6.

The above solubilized resin solution was pigmented and formulated into a coating composition as follows:

The following were ground in a steel ball mill, along with sufficient water to give a viscosity of 90KU, for 31 hours to a Hegman grind of 6¾:

| | Parts by weight |
|---|---|
| Lampblack | 12.4 |
| Talc | 16.6 |
| Strontium chromate | 26.0 |
| Lead silico chromate | 26.8 |
| Barytes (barium sulfate) | 302.7 |
| Beneficiated magnesium montmorillonite thickener | 4.5 |
| Anti-foaming agent | 1.8 |
| Drier solution (6% manganese naphthenate in mineral spirits) | 10.0 |
| Solubilized resin solution | 151.9 |

To this there were added 50 parts of deionized water, and the resultant paste was employed in the following formulation:

| | Parts by weight |
|---|---|
| Poly(ethyl acrylate) latex (50 percent solids) | 261.0 |
| Solubilized resin solution above | 151.6 |
| Tris(hydroxymethyl)nitromethane | 4.8 |
| Paste above | 562.7 |
| Organic phosphate surfactant | 5.0 |
| Butyl Cellosolve | 5.0 |

Sufficient water was added to make the total solids content 59.7 percent.

This product had excellent package stability, and when coated on phosphatized steel panels (Bonderite 100) by dipping and baked for 15 minutes at 275° F., had excellent film appearance and properties. For example, the panels were tested in salt spray for 250 hours and in a humidity cabinet for 250 hours, and were found to have outstanding corrosion resistance and humidity resistance. The impact resistance of the coating (80 inch lb.) was also found to be excellent.

By comparison, compositions based upon maleinized oils not produced in accordance with the invention have unsatisfactory properties. For example, a maleinized oil was produced as in the above example, except that the reactants were heated at 250° C. only until the viscosity was about 2300 centipoises (Gardner-Holdt viscosity of about Z). After hydrolysis and solubilization as above, its Gardner-Holdt viscosity was T+ and its pH 8.0, dropping to a viscosity of R and a pH of 7.3 after 7 days at 120° F. When this product was employed to make a pigment paste, as in the above example, even after 70 hours grinding time the maximum Hegman grind achieved was 6. When the paste was utilized in a coating composition as above, the pigments flocculated and the composition was unsatisfactory for normal use.

EXAMPLE 2

A mixture of 1800 parts of linseed oil and 200 parts of maleic anhydride was heated to 250° C. and held at that temperature for about 7 hours, until the Gardner-Holdt viscosity was Y—. The product was cooled, mixed with 250 parts of deionized water and refluxed for 3 hours. It was then solubilized by mixing the following:

| | Parts by weight |
|---|---|
| Hydrolyzed maleinized oil | 1123 |
| Ethyl Cellosolve | 424 |
| Butyl Carbitol | 47 |
| Diethylamine | 90 |
| Deionized water | 679 |

The product had a pH of 10.6, a solids content of 43.9 percent, an acid value of 32.8, and a Gardner-Holdt viscosity of U—V. A pigmented coating composition was formulated in the manner of Example 1, there being required 42 hours to achieve the same grind. The composition had excellent properties, as did coatings made therefrom.

EXAMPLE 3

The above Example 1 was repeated, except that triethylamine was employed in place of diethylamine and neutralization was carried out to a pH of 8.3. The product again had excellent pigment-dispersing properties and coating compositions made therefrom were stable and provided coatings having desirable properties.

EXAMPLE 4

A mixture of 5282 parts of linseed oil and 720 parts of maleic anhydride was heated to 290° C.; heating was continued for a total of 6 hours, whereupon the reaction product had a Gardner-Holdt viscosity of Z3. The product was cooled to 240° F. and 833 parts of water were added. This mixture was maintained at 200° F. for 3 hours and then cooled to 175° F. There were then added 285 parts of butyl Carbitol, 2550 parts of ethyl Cellosolve and 516 parts of diethylamine. After ½ hour at 135 to 155° F., there were added 1444 parts of aromatic naphtha (boiling point 185 to 203° C., Solvesso 150) and 2706 parts of water, along with sufficient diethylamine (about 35 parts) to make the pH 8.5. This product was employed as the vehicle in coating compositions similar to those above and was found to have highly desirable properties, both in grinding pigments and formulating coating compositions, and in the coatings produced therefrom.

Similar results to those of the above examples, are attained by substituting therein various other oils, bases and solvents, such as those mentioned hereinabove. Also, variations in the procedure employed, within the limits discussed above, can be used with satisfactory results. For example, the order of the steps can be varied somewhat or they can be carried out concurrently, so long as the desired product is obtained.

According to the provisions of the patent statutes, there are described above the invention and what are now considered to be its best embodiments. However, within the scope of the appended claims, it is to be understood that the invention can be practiced otherwise than as specifically described.

We claim:
1. A maleinized oil reaction product formed by the steps of
   (1) Co-reacting a glycerided rying oil with about 8 to about 15 percent by weight of maleic anhydride, based on the total weight of maleic anhydride and drying oil, to form a maleinized oil;
   (2) Maintaining said maleinized oil at an elevated temperature of at least about 250° C. for a time sufficient to raise its viscosity but not sufficient to cause gelation, the viscosity attained being varied in accord- ance with the proportion of maleic anhydride in said maleinized oil and being at least as follows:

| Weight percent of maleic anhydride | Minimum viscosity centipoises at 25° C. |
|---|---|
| 8 | 700 |
| 9 | 1000 |
| 10 | 1500 |
| 11 | 1900 |
| 12 | 2500 |
| 13 | 3100 |
| 14 | 3700 |
| 15 | 4500 |

(3) Mixing and reacting the maleinized oil with water; and
(4) Mixing and reacting the hydrolyzed maleinized oil with a base to neutralize at least part of the acidic carboxyl groups thereof.

2. The maleinized oil reaction product of claim 1 in which said step (4) is carried out with sufficient base to provide a product having a pH between about 8 and about 11.

3. The maleinized oil reaction product of claim 2 in which said base is a secondary lower alkylamine.

4. The maleinized oil reaction product of claim 3 in which said amine is diethylamine.

5. A water-dispersed coating composition in which the vehicle consists essentially of the maleinized oil reaction product of claim 1.

6. The coating composition of claim 5, in which said vehicle is dissolved in a mixture of about 20 to 50 percent by weight of coupling solvent and about 50 to 80 percent by weight of water.

7. The coating composition of claim 6, in which said coupling solvent is at least one member of the group consisting of alkyl monoethers of ethylene glycol, alkyl monoethers of diethylene glycol, furfuryl alcohol, dioxane and 3-methoxy-4-methylpentanone-2.

8. The coating composition of claim 5 in which said vehicle is dissolved in a mixture of about 20 to 40 percent by weight of coupling solvent, about 30 to 60 percent by weight of water, and about 10 to 25 percent by weight of hydrocarbon solvent.

9. The coating composition of claim 8 in which said coupling solvent is at least one member of the group consisting of alkyl monoethers of ethylene glycol, alkyl monoethers of diethylene glycol, furfuryl alcohol, dioxane and 3-methoxy-4-methylpentanone-2, and said hydrocarbon solvent is an aromatic hydrocarbon solvent.

10. The coating composition of claim 12 in which said latex contains a polymer of an ester of an acrylic acid.

11. The coating composition of claim 12 in which said latex contains a styrene-butadiene copolymer.

12. A water-dispersed coating composition in which the vehicle consists essentially of the maleinized oil reaction product of claim 1 and a synthetic polymeric latex, said vehicle containing at least about 20 percent by weight of said maleinized oil reaction product.

References Cited
UNITED STATES PATENTS

| | | | |
|---|---|---|---|
| 2,414,712 | 1/1947 | Bolley | 260—405 |
| 2,423,230 | 7/1947 | Eilerman | 106—82 |
| 3,230,162 | 1/1966 | Gilchrist | 204—181 |
| 3,251,790 | 5/1966 | Christenson et al. | 260—23 |
| 3,297,557 | 1/1967 | Huggard | 260—23 |

DONALD E. CZAJA, *Primary Examiner.*

R. A. WHITE, *Assistant Examiner.*

U.S. Cl. X.R.

260—23, 29.6, 29.7, 41, 41.5, 404.8, 33.2, 33.6